Figure 1:
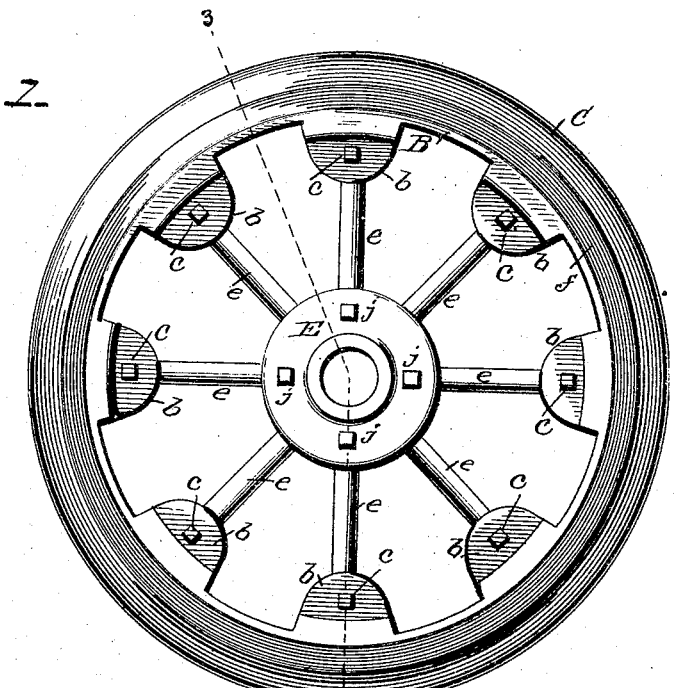

No. 782,465. PATENTED FEB. 14, 1905.
E. L. PERRY.
VEHICLE WHEEL.
APPLICATION FILED OCT. 5, 1904.

2 SHEETS—SHEET 1.

WITNESSES
INVENTOR
Edward L. Perry,
per Chas. H. Fowler
Attorney

No. 782,465. PATENTED FEB. 14, 1905.
E. L. PERRY.
VEHICLE WHEEL.
APPLICATION FILED OCT. 5, 1904.
2 SHEETS—SHEET 2.
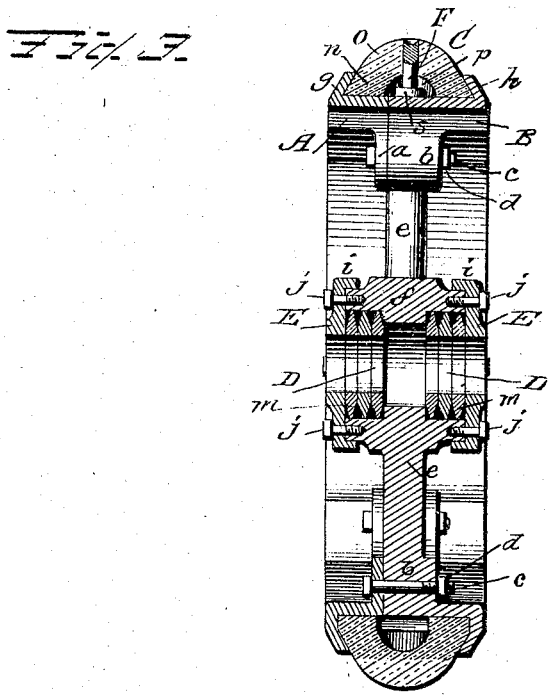
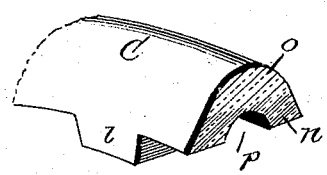
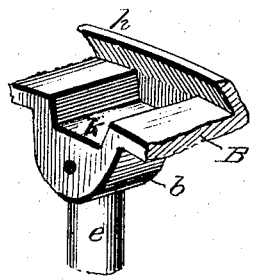
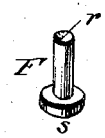
WITNESSES
INVENTOR
Edward L. Perry.
per Chas. N. Fowler
Attorney No. 782,465. Patented February 14, 1905.

UNITED STATES PATENT OFFICE.

EDWARD L. PERRY, OF PATERSON, NEW JERSEY.

VEHICLE-WHEEL.

SPECIFICATION forming part of Letters Patent No. 782,465, dated February 14, 1905.

Application filed October 5, 1904. Serial No. 227,252.

*To all whom it may concern:*

Be it known that I, EDWARD L. PERRY, a citizen of the United States, residing at Paterson, in the county of Passaic and State of New Jersey, have invented certain new and useful Improvements in Vehicle-Wheels; and I do hereby declare that the following is a full, clear, and exact description of the same, reference being had to the annexed drawings, making a part of this specification, and to the letters of reference marked thereon.

The present invention has for its object to provide a wheel for horseless carriages, such as automobiles and other like vehicles, in which said wheel will be increased in durability and will possess advantages not found in the wheels in ordinary use, the elastic tire being solid and so constructed that it will have two different grades of elasticity, and the manner of connecting it to the rim of the wheel prevents the possibility of the tire becoming loose, and in many respects a wheel is provided that will have many advantages of superiority in its several details of construction.

The invention consists in a vehicle-wheel constructed substantially as shown in the drawings and hereinafter described and claimed.

Figure 2:
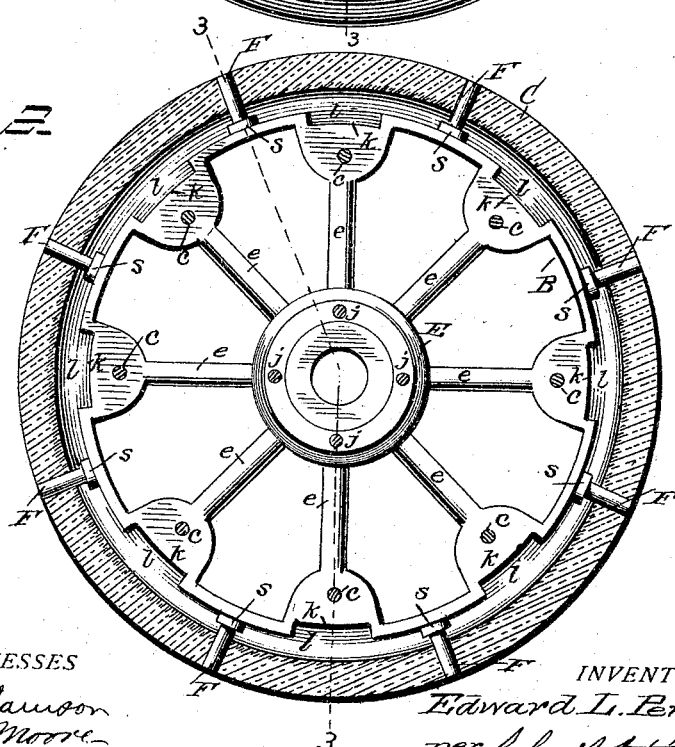

Figure 1 of the drawings is a side elevation of a wheel embodying my invention; Fig. 2, a horizontal section of Fig. 1; Fig. 3, a transverse sectional elevation taken on lines 3 3 of Figs. 1 and 2; Fig. 4, a detail perspective view of a portion of the elastic tire, showing the difference in the grades of elasticity; Fig. 5, a detail perspective view of a portion of the rim, flange thereto, and a portion of one of the spokes; Fig. 6, a perspective view of one of the gripping-pins.

In the accompanying drawings the rim of the wheel is constructed of two sections or parts, as shown at A B, having respectively the lugs $a\, b$ to enable the sections to be connected together by the bolts $c$ and nuts $d$, thereby forming a rim comprising two separable sections or parts. The section B is cast or otherwise provided with the radial spokes $e$, which connect a central hub $f$, and the rim-sections A B have inwardly-projecting flanges $g\, h$ to receive the elastic tire C.

The construction of wheel, as above described, is one of many forms that may be used in connection with my invention, and therefore I do not wish to be understood as limiting the invention thereto.

Located within the hub $f$ is a plurality of bearing-rings D, held in place by plates E, which have a central opening to correspond in size to the opening in the rings, said plates having inwardly-projecting flanges $i$ to overlap the ends of the hub and the plates held securely in place by screws $j$ or other suitable fastenings, as shown more clearly in Fig. 3 of the drawings. The rings D, which are preferably constructed of tempered steel, have their outer periphery or edge tapering, as shown at $m$ in Fig. 3 of the drawings, so as to prevent the sides or faces of the rings coming in frictional contact with each other, thereby greatly reducing the friction thereon, the rings being loosely supported in the hub.

The rim-sections A B have sockets $k$ to receive projections $l$ on the elastic or rubber tire C, so as to hold said tire firmly upon the rim, which, in connection with the flanges $g\, h$ of the rim-sections, provide a perfect and secure means for retaining the tire in position and preventing it from becoming loose. The tire C is composed of an elastic material of two different grades, the inner portion $n$ being made practically of a non-elastic composition and the outer portion $o$ of an elastic composition or cushion. The construction of the tire as above described is shown in detail in Fig. 4 of the drawings. The substantially non-elastic inner portion $n$ is to prevent the tire from "buckling" or changing its shape when the two rim-sections are drawn together, the outer portion or tread of the tire being elastic to give it the same qualifications of a pneumatic tire, while the inner portion is rigid and forms a reinforce to the outer portion, the two different grades of elasticity being considered of material importance in securing the tire to the wheel.

In order to increase the elasticity of the outer portion of the tire, the same is arched around its interior as shown in $p$, which forms an air-space and adds to the durable qualities of the tire, the lugs or projections $l$ being of the same non-elastic material as the inner portion of the tire, so that when engaged with the sockets k the lugs or projections will be securely held therein, as would not be the case were the same elastic.

Gripping-pins F loosly engage holes in the tire C, said holes extending entirely through said tire, so that the gripping end of the pin will be exposed when the tire is compressed, the pin having a countersunk end, as shown at r, or constructed in any other suitable manner that will grip or engage the foundation upon which the tire is traveling, and I do not desire to be understood as limiting my invention to any special construction of gripping-pin, as it is subject to many changes or modifications without in any manner departing from the essential purpose thereof. The head s of the pins rests upon the outer surface of the rim of the wheel, and in the present instance the heads rest upon the section B, which forms a support thereto. That portion of the tread of the tire C around the pin F when it comes in contact with the ground or foundation upon which the wheel is running will be compressed and the end of the pin F exposed so that the end of the pin will engage the ground or foundation, and thereby prevent the tire from slipping, which is considered of importance when the vehicle is turning a curve or passing over an icy surface.

In describing the wheel in the various details of construction I do not wish it understood that it is essential to the perfect operation of the parts that the precise form and construction should be followed, as it is evident that many changes that would suggest themselves may be made as circumstances would require and still retain the essential and important features of the invention.

Having now fully described my invention, what I claim as new, and desire to secure by Letters Patent, is—

1. A vehicle-wheel and a suitable rim therefor, an elastic perforated tire held therein, and a plurality of gripping-pins loosely supported upon the rim, and the outer ends engaging the perforation in said tire, substantially as and for the purpose set forth.

2. A vehicle-wheel and a suitable rim therefor, an elastic perforated tire held therein, and a plurality of gripping-pins loosely supported upon the rim and engaging the perforations, said pins having their outer ends countersunk, substantially as and for the purpose specified.

3. A wheel and an elastic tire held upon the rim thereof, said tire being arched upon its under surface, and gripping-pins loosely extending through the tire, substantially as and for the purpose described.

4. A vehicle-wheel and a rim therefor, said rim comprising two separable sections each having an inwardly-projecting flange and a socket, an elastic tire formed with projections to engage the sockets and a plurality of gripping-pins loosely supported upon the rim and engaging the perforations in the tire, substantially as and for the purpose set forth.

In testimony whereof I affix my signature in presence of two witnesses.

EDWARD L. PERRY.

Witnesses:
JOHN L. FLETCHER,
MARY L. BRAHLER.